United States Patent [19]

Webber et al.

[11] Patent Number: 5,577,764
[45] Date of Patent: Nov. 26, 1996

[54] FASTENERLESS SUPPLEMENTAL INFLATION RESTRAINT MOUNTING

[75] Inventors: James L. Webber, Centerville; Francis J. Holmes, Beavercreek; Troy A. Augustine, Kettering, all of Ohio

[73] Assignee: General Motors Corporation, Detroit, Mich.

[21] Appl. No.: 506,059

[22] Filed: Jul. 24, 1995

[51] Int. Cl.⁶ .................................................. B60R 21/16
[52] U.S. Cl. ........................................ 280/728.2; 280/732
[58] Field of Search .................................. 280/728.2, 732

[56] References Cited

U.S. PATENT DOCUMENTS

| | | | |
|---|---|---|---|
| 5,069,480 | 12/1991 | Good | 280/728.2 |
| 5,141,247 | 8/1992 | Barth | 280/728.2 |
| 5,320,379 | 6/1994 | Burnard et al. | 280/728.2 |
| 5,342,084 | 8/1994 | Rose et al. | 280/728.2 |
| 5,423,568 | 6/1995 | Zushi et al. | 280/728.2 |
| 5,427,406 | 6/1995 | Zushi et al. | 280/728.2 |
| 5,445,406 | 8/1995 | Jones | 280/728.2 |
| 5,454,587 | 10/1995 | Halford et al. | 280/732 |
| 5,456,489 | 10/1995 | Rose et al. | 280/728.2 |

FOREIGN PATENT DOCUMENTS

| | | |
|---|---|---|
| 653115 | 9/1994 | Australia. |
| 0631908A1 | 5/1994 | European Pat. Off.. |

*Primary Examiner*—Kenneth R. Rice
*Attorney, Agent, or Firm*—Ernest E. Helms

[57] ABSTRACT

An arrangement of a supplemental inflation restraint for an automotive vehicle is provided including an elongated inflator having a main axis and also having first and second ends, and a housing for mounting within the vehicle which has a first end joined to and spaced from a second end. The housing first end has spring fingers for compliantly spheroidally mounting the first end of the inflator. The housing second end has an opening large enough for passage of the inflator first end. The housing also has a twist lock connection with the second end of the inflator to prevent the inflator from exiting the housing when the inflator is activated.

7 Claims, 5 Drawing Sheets

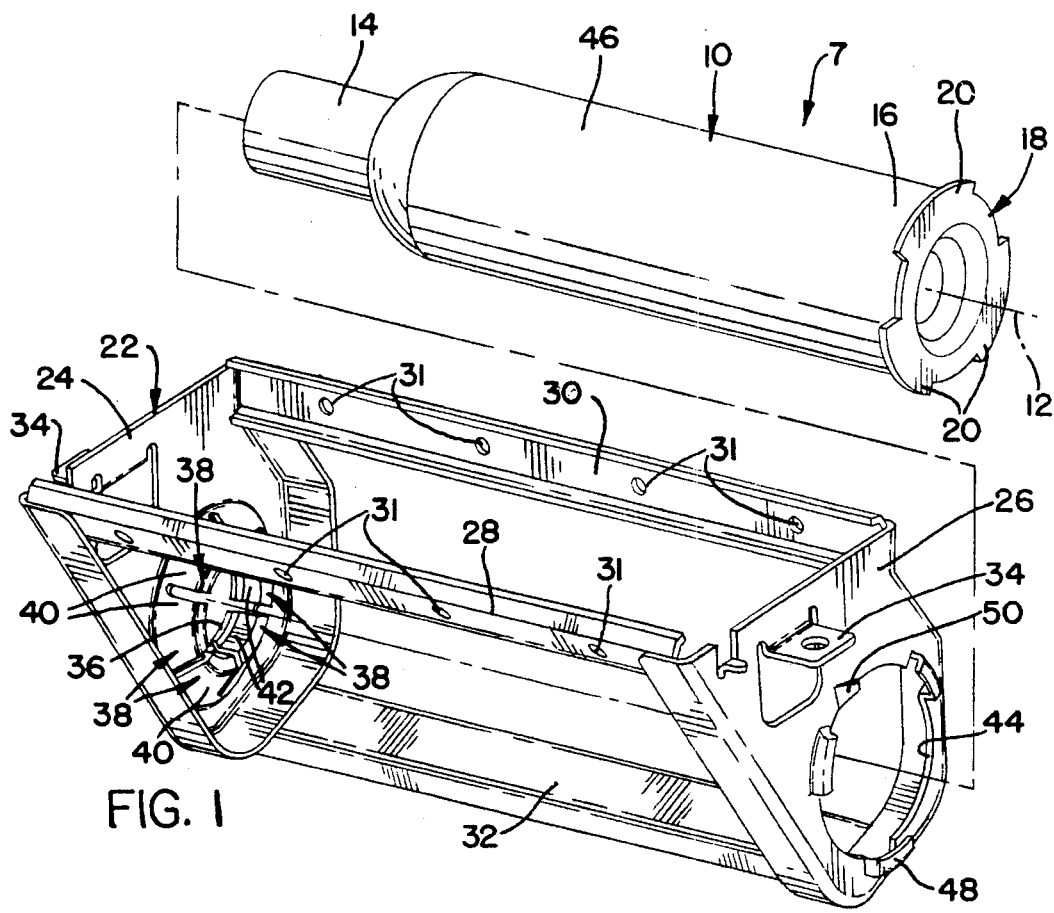
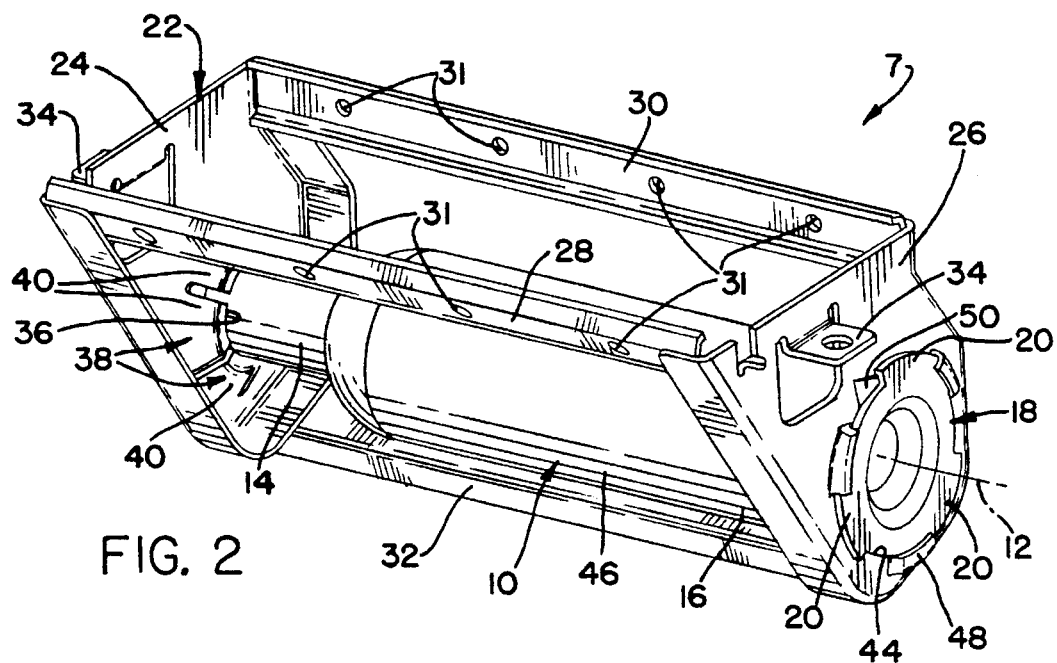

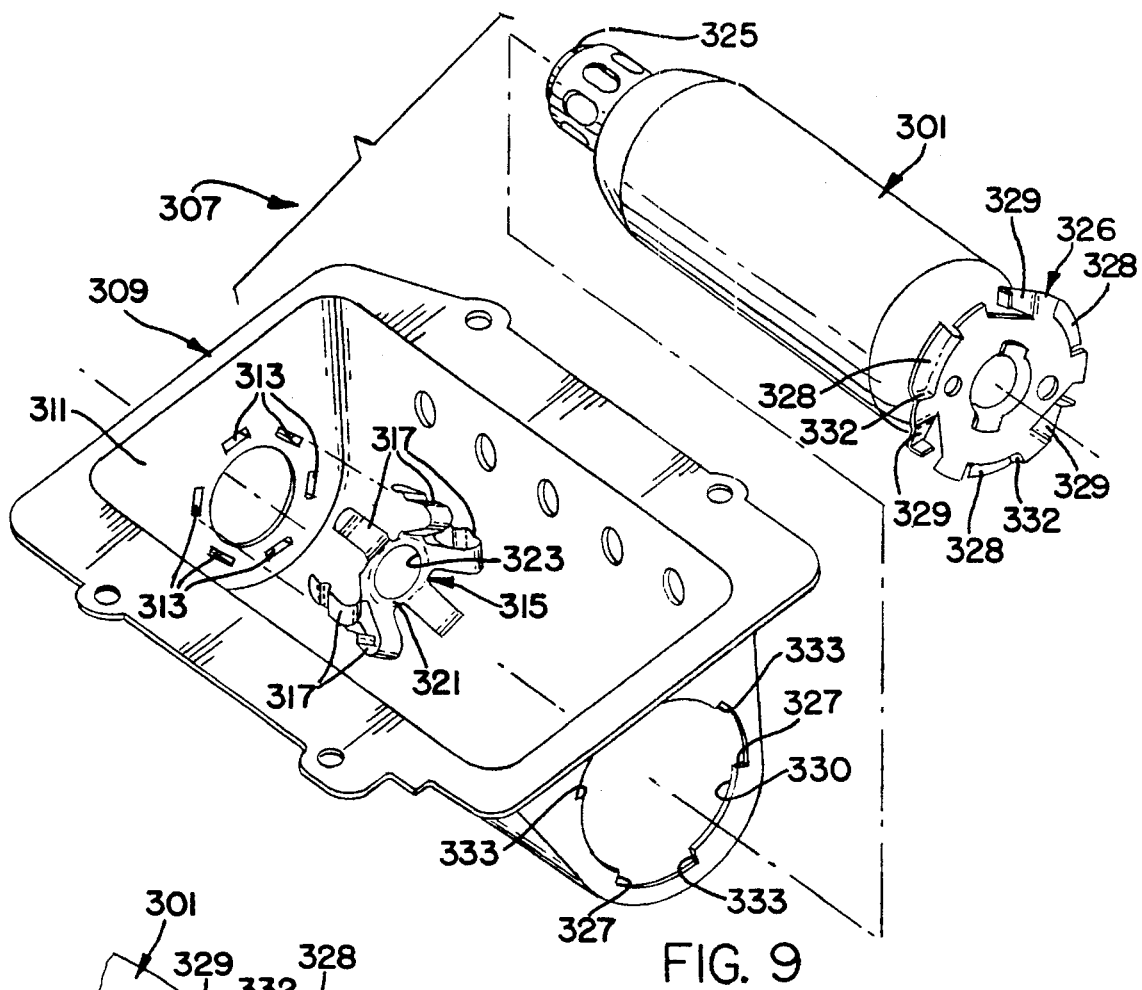
FIG. 9
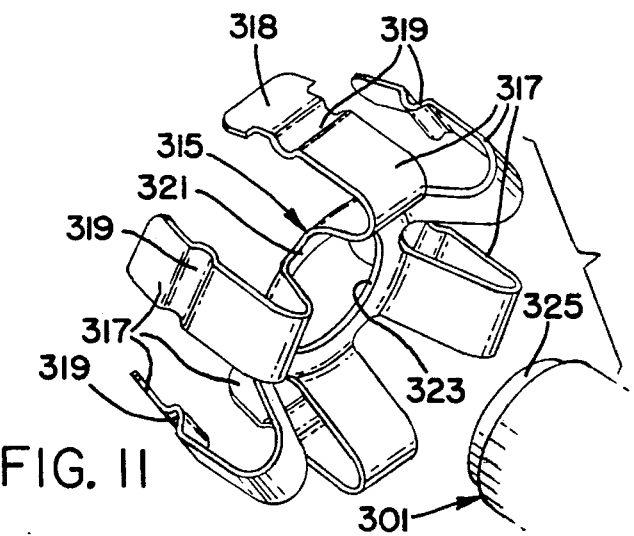
FIG. 10
FIG. 11

FASTENERLESS SUPPLEMENTAL INFLATION RESTRAINT MOUNTING

FIELD OF THE INVENTION

The field of the present invention is that of supplemental inflation restraints (SIR), often referred to as air bags, for automotive vehicles. More particularly, the present invention provides an arrangement and method of utilization thereof of an SIR arrangement particularly useful on a passenger side of a vehicle.

BACKGROUND OF THE INVENTION

Most passenger-side SIRs have a housing mounted within a dashboard covered by a pop-open cover. Secured to the housing is a fabric envelope. Secured within the housing is an inflator. Typically, most passenger-side inflators are cylindrical in shape and are inserted within the housing through a side of the housing. When the inflator is ignited, the gas pressure within the housing exerts a pressure force within the housing which seeks to propel the inflator out of the housing. To secure the inflator during the ignition stages, three major techniques have been utilized.

A first inflator securing technique is shown in U.S. Pat. No. 5,364,123. In this design, an inflator has at its end a threaded stud which is secured by a nut to a first end of the housing. Although this arrangement works in a technically acceptable fashion, to ensure safety the torquing of the nut over the thread is monitored to be within a very small range of torque during the assembly operation. If for some reason the stud threads become stripped during installation, the entire inflator must be scrapped. The inflator has a very high economic content, and scrapping of an inflator is highly undesirable.

A second technique for securing the inflator within the housing is to provide a retainer which encircles the inflator. A series of set screws threaded along the length of the housing is provided to force the inflator against the retainer. The set screw method is shown in U.S. Pat. No. 5,340,147. Again, this technique provides a disadvantage of having to monitor the torquing of several screws along with the additional disadvantage of causing the screw to impinge upon the inflator. Care must be taken to ensure that the contact between the set screw and the inflator is not such that the inflator cylinder is damaged.

A third technique of retaining the inflator within the housing is almost a reverse of the set screw technique wherein an encircling retainer clamp is screwed down within the housing to act as a gigantic clamp around the inflator. It would be desirable to provide an SIR arrangement wherein the inflator may be assembled to the housing without the utilization of threaded fasteners.

SUMMARY OF THE INVENTION

The present invention meets the above-noted desire by providing which in a preferred embodiment is installed through a hole in one side of the housing and is spheroidically compliantly compressively held at one end by fingers at one end of the housing and at the opposite end has a twist lock connection with the housing to secure itself therein.

BRIEF DESCRIPTION OF THE DRAWINGS

FIG. 1 is a perspective view of a preferred embodiment SIR arrangement of the present invention illustrating an inflator before installation through an aperture in a second end of a housing.

FIG. 2 is a perspective view similar to that of FIG. 1 demonstrating installation of the inflator within the housing with a first end of the inflator spheroidically held within the first end of the housing.

FIG. 9 is a view similar to FIG. 2 of another alternate preferred embodiment.

FIGS. 10 and 11 are enlarged views of portions of the embodiment of the present invention shown in FIG. 9.

DESCRIPTION OF THE PREFERRED EMBODIMENT

Figure 3:
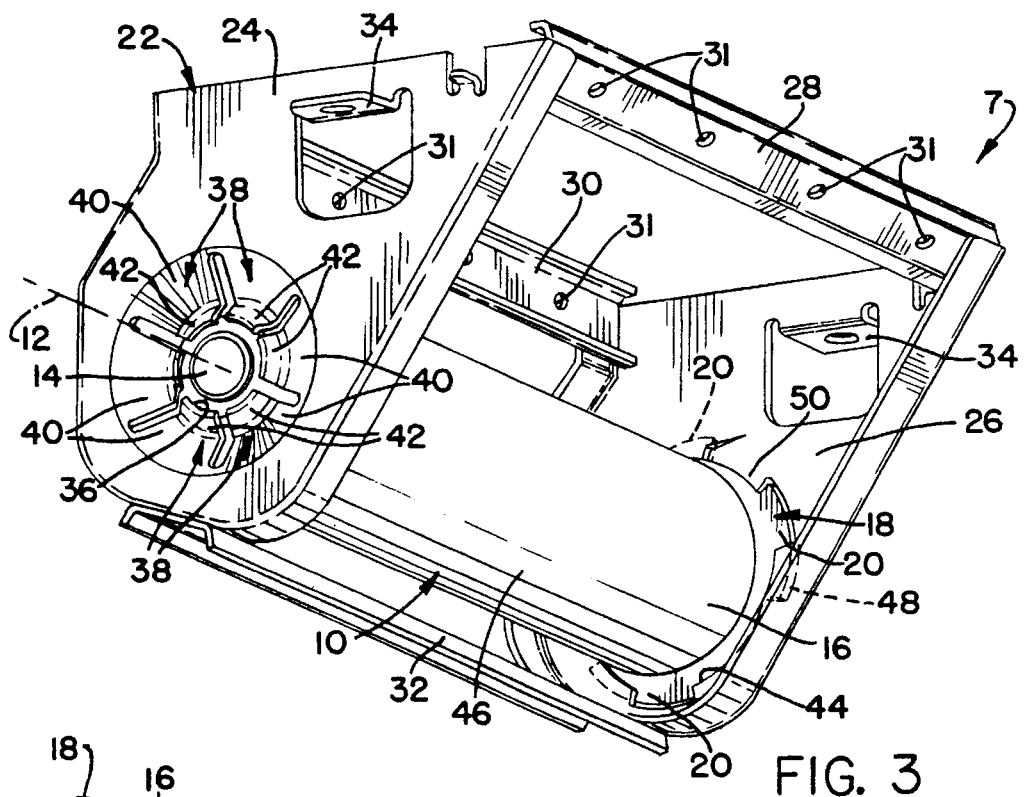
FIG. 3 is a perspective view taken at a different angle of the SIR arrangement shown in FIG. 2.

Referring to FIGS. 1–7, the automotive SIR arrangement 7 according to the present invention has an inflator 10. The inflator is generally cylindrical, having a main axis 12 and a first end reduced diameter portion 14. Spaced away from the first end 14 is a second end 16 which has formed thereon a stamped flange 18. The flange 18 has three geometrically spaced ears 20.

The inflator 10 is held in position by a housing 22. The housing 22 has a first end 24 and a second end 26 which is generally parallel and spaced from the first end 24. Joining the first and second ends 24, 26 together are rails 28, 30 and 32. The rails 28, 30 and 32 are typically welded to the ends 24 and 26. Tabs 34 are provided to facilitate the connection of the housing 30 to the vehicle. Holes 31 are provided to facilitate the connection of an air bag cushion and door (not shown).

At the first end 24, the housing has an aperture 36 with a plurality of bent-over cantilevered fingers 38. The fingers have a first portion 40 which slants radially inwardly toward the second end 26 and a second portion 42 which is inclined in a gradual manner radially inwardly and projects away from the second end 26. The net effect of the fingers 38 is to spheroidically compliantly clasp the reduced diameter first end 14 of the inflator, positioning the inflator end 14, radially centering and axially biasing the inflator 10 toward the housing second end 26 as best shown in FIGS. 2 and 3.

As best shown in FIG. 1, the second end 26 has an aperture 44 large enough for the entry of the first end 14 and main body 46 of the inflator. Near the periphery of the aperture 44, the second end has clasp 48. To assemble the inflator 10 within the housing 22, the inflator 10 is directed through the second end aperture 44 with its first end 14 to be acted upon by the fingers 38. The inflator is then torqued, bringing the ears 20 into a captured arrangement with the clasp 48 as best shown in FIG. 2. A tab or spike 50 prevents the flange 20 from backing out once it is in an assembled position.

Figure 4:
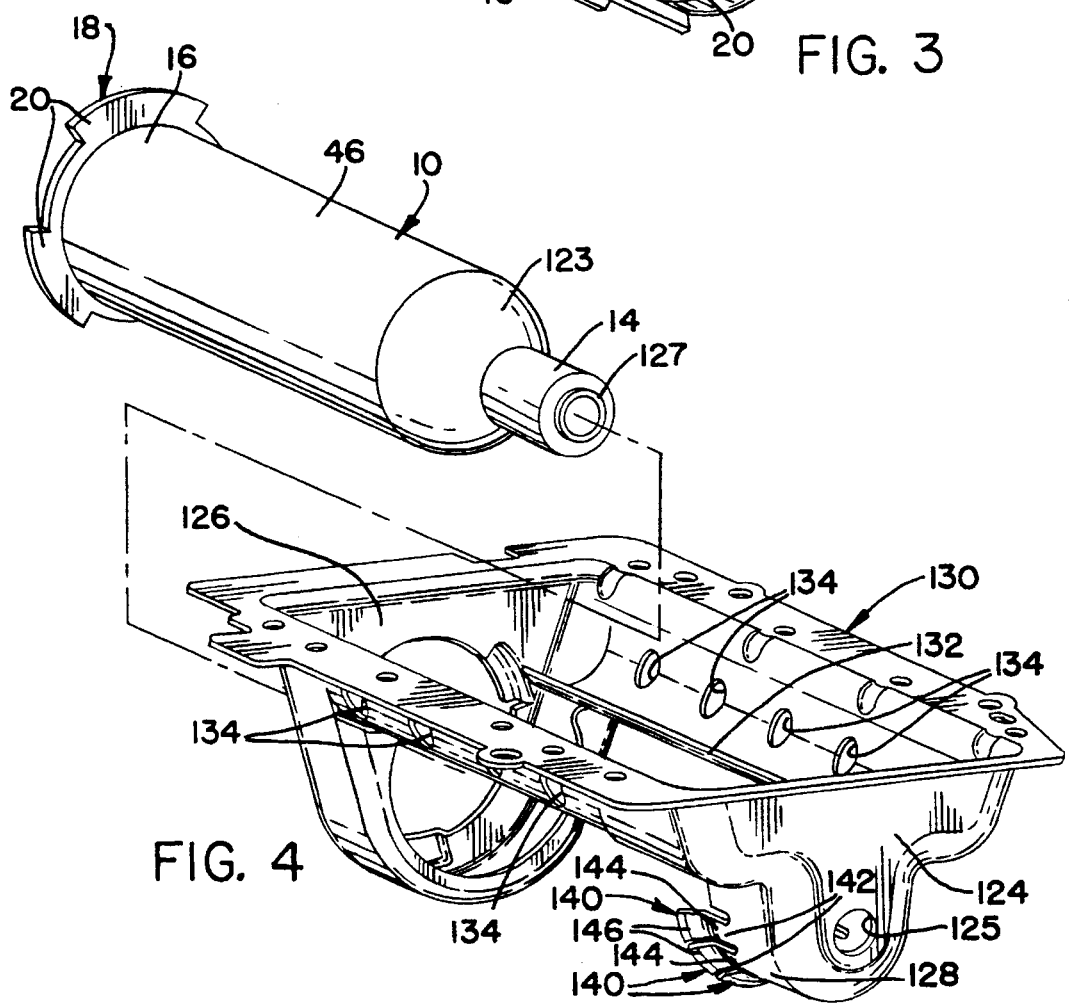
FIGS. 4 and 5 are perspective views similar to FIGS. 1 and 2 which illustrate an alternative preferred embodiment of the present invention having a different kind of compliant finger on a first end of a housing.
Figure 5:
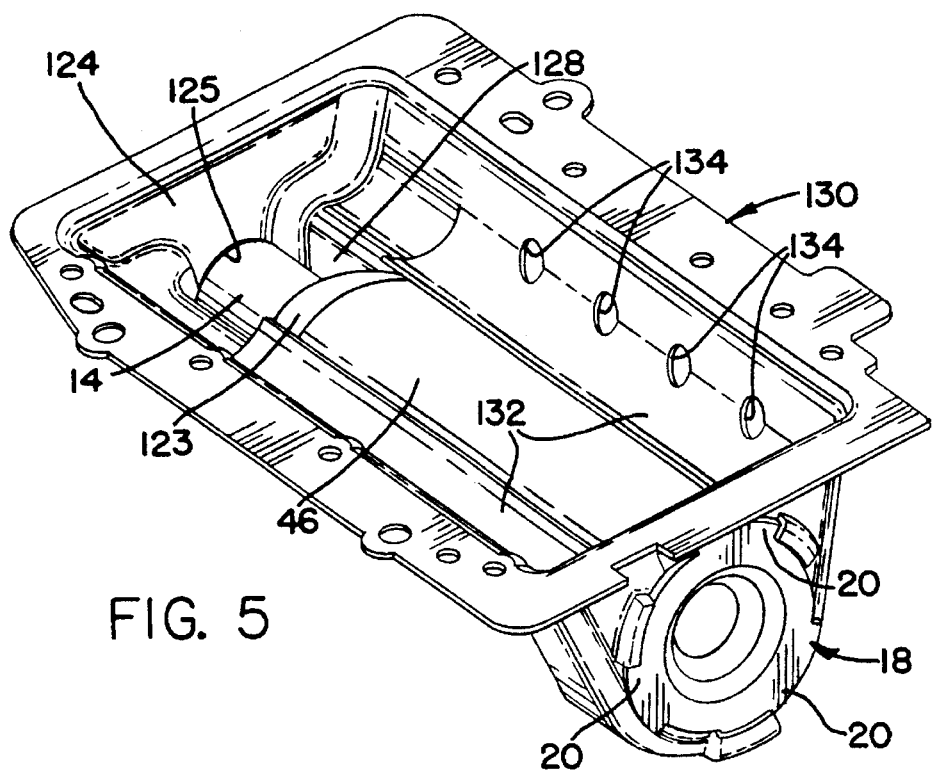

Referring to FIGS. 4 and 5, an alternate preferred embodiment of the present invention provides a housing 130. The housing 130 additionally is provided with a lap portion 132 which has defuser apertures 134 drilled therein. The first end 124 has an alignment aperture 125 to align an alignment ring 127 of the inflator 10. The first end 124 also forms a nest 128 which holds the reduced diameter portion 14 of the inflator. At the end of the nest 128, there are projecting therefrom a semicircle of biasing fingers 140 having a base 142, a radially outwardly projecting midportion 144 and an outer radial nail 146 inclined at a more extreme angle. The spheroidically acting fingers 140 are formed in such a way as to push on a shoulder 123 of the inflator 10 both in a radially inward fashion and in a manner to bias it toward a second end 126 of the housing.

Figure 6:
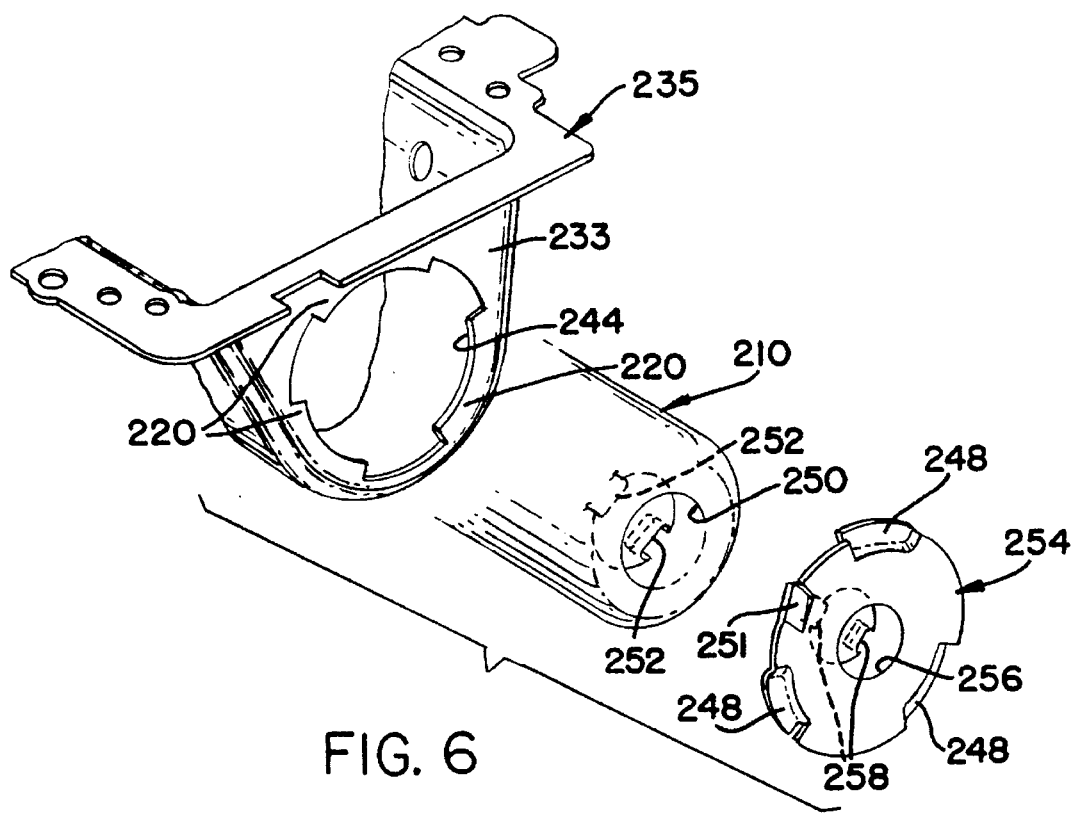
FIG. 6 is a exploded view of still another alternate preferred embodiment according to the present invention having a separate piece between an inflator and a housing.
Figure 7:
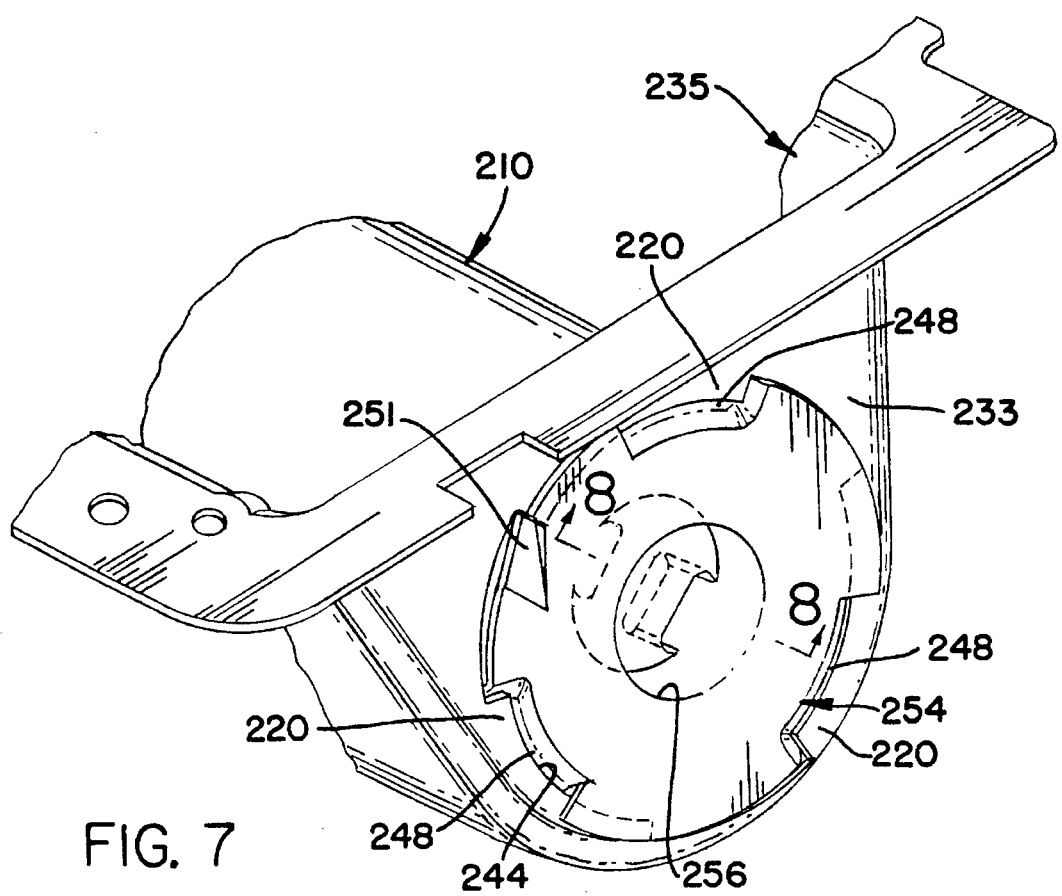
FIG. 7 is a perspective view similar to FIG. 6 illustrating installation of the inflator at the second end of the housing.
Figure 8:
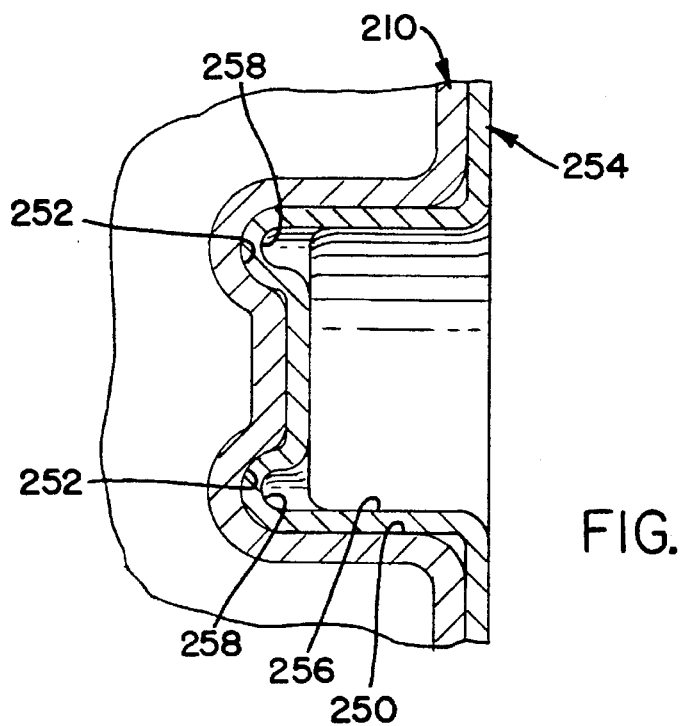
FIG. 8 is an enlarged sectional view taken along line 8—8 of FIG. 7.

Referring further to FIGS. 6, 7 and 8, an inflator 210 has an indention 250 with dimples 252. Fitted within the indention 250 is an intermediate piece 254 having a generally aligned and matching indention 256 and dimples 258. The matching of the dimples 252 and 258 assures torsional alignment between the intermediate piece 254 and the inflator 210 as the indentions 256 and 250 in like manner ensure radial alignment. The intermediate piece 254 has clasp members 248 along with a tab 251. After the assembly of the intermediate member 254 to the inflator 210, the inflator 210 and intermediate member 254 essentially act as one structural member and lock to the end 233 of housing 235 within a second aperture 244 having ears 220.

A substantial advantage of the embodiment of the invention shown in FIGS. 6–8 is that a complex stamping may be made on the intermediate piece. Additionally, the fabrication of the end 233 of the housing 235 is much simpler.

Referring to FIGS. 9–11, an alternate preferred embodiment of the present invention is provided having a supplemental inflation restraint arrangement 307. The restraint arrangement 307 has a housing 309 which may be fabricated from a single stamping. The housing 309 has a first end 311 with a plurality of apertures 313 geometrically spaced from one another. Placed within the apertures 313 are legs 317 of a spring spider 315. The spring spider legs 317 have indentions 319 which capture the spider within the apertures 313. If desired, a tab end 318 of the spider may be bent over to ensure retention of the spider with the housing 309. The spider legs 317 are joined to a central body 321 having a central aperture 323. The aperture 323 captures an inflator 301 about a reduced diameter portion 325.

FIG. 10 illustrates an intermediate piece 326 with improved retention tabs 329. Upon torquing of the inflator 301, the intermediate piece flanges 328 will go under edges 327 of the housing aperture 330 and proceed until edges 332 of the intermediate piece hit edges 327, whereupon tabs 329 ends 331 will be mated against edges 333 of the housing aperture 330, locking the inflator in position and preventing it from being torqued out inadvertently for removal. The plurality of tabs 329 help ensure an additional measure of safety and also ensure that the inflator 301 is secured to prevent the generation of noise from rattling.

A particular advantage of all the embodiments shown and especially that shown in FIGS. 9–11 of the present invention is that the spider or spring finger arrangement may incorporate inflators from different manufacturers and/or inflators of various lengths and can tolerate a high degree of lengthwise dimensional variation of the inflator.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An arrangement of a supplemental inflation restraint for an automotive vehicle comprising:

an elongated inflator having a main axis, the inflator having a first end and a second end; and a housing for mounting within the vehicle, the housing having a first end fixably joined to and spaced from a second end, the housing first end having spring fingers for compliantly spheroidically mounting the first end of the inflator in compression, the housing having a second end with an opening large enough for passage of the inflator first end, the housing also having a twist lock connection with the second end of the inflator for preventing the inflator from exiting the housing when the inflator is activated.

2. An arrangement of a supplemental inflation restraint as described in claim 1 wherein the housing aperture has a plurality of lobes and a plate adapted for abutting engagement with the second end of the inflator, the plate having an eared edge for a twist lock connection with the housing second end to secure the inflator within the housing.

3. An arrangement of a supplemental inflation restraint as described in claim 1, wherein an intermediate piece is radially aligned with the second end of the inflator and wherein the intermediate piece has a twist lock connection with the housing second end.

4. A method of arranging a supplemental inflation restraint within an automotive vehicle comprising:

affixing to the automotive vehicle a housing having first and second ends connected to one another but spaced from one another, the housing having first and second ends with an aperture on its second end;

inserting within the housing through the housing second end an inflator with first and second ends with a longitudinal axis;

spheroidically compressively holding the first end of the inflator with fingers projecting from the first end of the housing; and securing the inflator within the housing by torquing the housing within the inflator, causing a twist lock connection between the inflator and the housing second end to torsionally secure.

5. An arrangement of a supplemental inflation restraint for an automotive vehicle comprising:

an elongated inflator having a main axis, the inflator having a first end and a second end;

a spring spider having a body compliantly compressively mounting a first end of the inflator; and a housing for mounting within the vehicle, the housing having a first end joined to and spaced from a second end, the housing first end being connected to and mounting the spider, the housing having a second end with an opening large enough for passage of the inflator first end, the housing also having a twist lock connection with the second end of the inflator for preventing the inflator from exiting the housing when the inflator is activated.

6. An arrangement of a supplemental inflation restraint as described in claim 5, wherein the housing is a one-piece stamped member.

7. A method of arranging a supplemental inflation restraint within an automotive vehicle comprising:

affixing to the automotive vehicle a housing having first and second ends connected to one another but spaced from one another, the housing having first and second ends with an aperture on its second end;

connecting in a fastenerless manner with the second end of the housing a compliant spider;

inserting within the housing through the housing second end an inflator with first and second ends along a longitudinal axis;

compliantly compressively holding the first end of the inflator with the spider; and securing the inflator within the housing by torquing the inflator within the housing, causing a twist lock connection between the inflator and the housing second end to torsionally secure.

* * * * *